United States Patent
Bangolae et al.

(10) Patent No.: US 7,583,606 B2
(45) Date of Patent: *Sep. 1, 2009

(54) REDUCING OVERHEAD WHEN USING LOOPBACK CELLS FOR FAULT DETECTION IN BI-DIRECTIONAL VIRTUAL CIRCUITS

(75) Inventors: Balaji Lakshmikanth Bangolae, Bangalore (IN); Sudhakar Shenoy, Bangalore (IN); Shiju Joseph, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 592 days.

This patent is subject to a terminal disclaimer.

(21) Appl. No.: 11/163,360

(22) Filed: Oct. 17, 2005

(65) Prior Publication Data

US 2006/0039292 A1 Feb. 23, 2006

Related U.S. Application Data

(63) Continuation of application No. 09/924,722, filed on Aug. 9, 2001, now Pat. No. 7,088,682.

(51) Int. Cl.
*G01R 31/08* (2006.01)
(52) U.S. Cl. ...................... 370/249; 370/236
(58) Field of Classification Search .............. 370/235, 370/236, 236.2, 241.1, 242, 244, 248, 249, 370/252, 253
See application file for complete search history.

(56) References Cited

U.S. PATENT DOCUMENTS

| | | | |
|---|---|---|---|
| 6,636,484 B1 * | 10/2003 | Agrawal et al. | 370/248 |
| 6,873,599 B1 * | 3/2005 | Han | 370/249 |
| 6,882,626 B1 * | 4/2005 | Marathe et al. | 370/241.1 |
| 7,088,682 B1 * | 8/2006 | Bangolae et al. | 370/249 |

* cited by examiner

*Primary Examiner*—Ricky Ngo
*Assistant Examiner*—Christine Ng
(74) *Attorney, Agent, or Firm*—Patent Capital Group

(57) ABSTRACT

An end system ("first end system") concluding that a bi-directional virtual circuit is operational if the other end system (at the other end of the virtual circuit) has determined that the virtual circuit is operable based on the loopback cells. In other words, the first end system may not send loopback cells, and instead rely on the determination of the other end system. As a result, the total number of loopback cells may be reduced on a network backbone.

17 Claims, 4 Drawing Sheets

US 7,583,606 B2

REDUCING OVERHEAD WHEN USING LOOPBACK CELLS FOR FAULT DETECTION IN BI-DIRECTIONAL VIRTUAL CIRCUITS

RELATED APPLICATION

The present application is a continuation of and claims priority from copending U.S. patent application Ser. No. 09/924,722, Filed: Aug. 9, 2001, For: "Reducing Overhead When Using Loopback Cells for Fault Detection in Bi-Directional Virtual Circuits", naming the same inventors as in the subject patent application, and is incorporated in its entirety herewith.

BACKGROUND OF THE INVENTION

1. Field of the Invention

The present invention relates to telecommunication networks, and more specifically to a method and apparatus for reducing overhead when using loopback cells for fault detection of bi-directional virtual circuits.

2. Related Art

Bi-directional virtual circuits are often provided to enable data transfers between two systems in a network. A bi-directional virtual circuit refers to a virtual circuit in which data traverses the same set of intermediate devices (forming the path) in both the directions. As an example, a virtual circuit provides communication between two end systems (e.g., edge routers or other devices interfacing directly with an ATM switch) in asynchronous transfer mode (ATM) networks, and the same intermediate switches provide the path between the two end systems in both directions.

Loopback cells are often used to detect faults in the path of virtual circuits. In a typical scenario, each end system ("source end system") sends a loopback cell ("loopback command") directed to the other end system (i.e., at the other end of the virtual circuit), and the other end system sends back the cell ("loopback acknowledgment") with potentially some acknowledgment information incorporated within the cell. The source end system determines the status of the path (including intermediate devices and connecting transmission lines) depending on whether the loopback response is received or not.

OAM (operation, administration and maintenance) cells (both commands and acknowledgment/responses) used in the context of ATM networks are examples of the loopback cells. Only some of the details of OAM are described here for conciseness. For further details on OAM, the reader is referred to ITU_T Recommendation I.610 entitled, "Series I: Integrated Services Digital Network—Maintenance principles B_ISDN operation and maintenance principles and functions", which is incorporated in its entirety herewith. At least in OAM related implementations, both end systems (at either end of a virtual circuit) independently check the status of the PVC.

One problem with such implementations is that the overhead on the components in the network due to resulting traffic (i.e., command and acknowledgment loopback cells) may be unacceptably high. The overhead may include use of bandwidth (which may otherwise be available for other applications) on the communication links and also buffering/processing overhead on all the devices in the virtual circuit path. Such overhead is particularly high on end systems which may need to process the cells more than other devices. The overhead may be unacceptable at least in that the corresponding end system implementations may not scale to large networks (employing a lot of end systems).

Accordingly, what is needed is a method and apparatus which reduces fault management related traffic (cells) when using loopback cells for fault detection of bi-directional virtual circuits.

SUMMARY OF THE INVENTION

An end system ("first end system") at one end of a bi-directional virtual circuit sends loopback response cells in response to loopback command cells received from another end system. The another end system determines the status of the virtual circuit based on the loopback response cells. The first end system concludes that the virtual circuit is operational if the another end system determines that the virtual circuit is operational.

As the first end system need not send loopback command cells to determine the status of the virtual circuit, the overhead on the backbone network (on which the virtual circuit is provisioned) and any devices in the path of the virtual circuit is reduced.

In an embodiment, the first end system may conclude that the virtual circuit is operational by examining the frequency (receive frequency) at which the loopback command cells are received. If the receive frequency does not change substantially over time, the first end system concludes that the other end system has determined that the virtual circuit is operational.

Accordingly to an aspect of the present invention, an end system with lower sending frequency stops sending the loopback command cells when both end systems implement the features of the present invention. When the two end systems send with the same sending frequency, both systems may wait a respective random amount of time before stopping to send the loopback command cells. Only the system waiting more time continues sending the loopback command cells.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE DRAWINGS

The present invention will be described with reference to the accompanying drawings, wherein.

DETAILED DESCRIPTION OF THE PREFERRED EMBODIMENTS

1. Overview and Discussion of the Invention

An end system ("first end system") in accordance with the present invention concludes that a bi-directional virtual circuit is operational if the end system at the other end has determined that the virtual circuit is operational based of loopback command and acknowledgment cells. As the other end system would have ensured operability of the virtual circuit in both the directions due to the loopback cells, the first end system may reasonably rely on the determination of the other end system.

Accordingly, the first end system may not send loopback command cells so long as the other end system continues with the determination that the virtual circuit is operational. As a result, up to 50% of the fault management related packets may be reduced on a network.

The invention is described below with reference to an example environment for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the invention. Furthermore the invention can be implemented in other environments.

2. Example Environment

Figure 1:
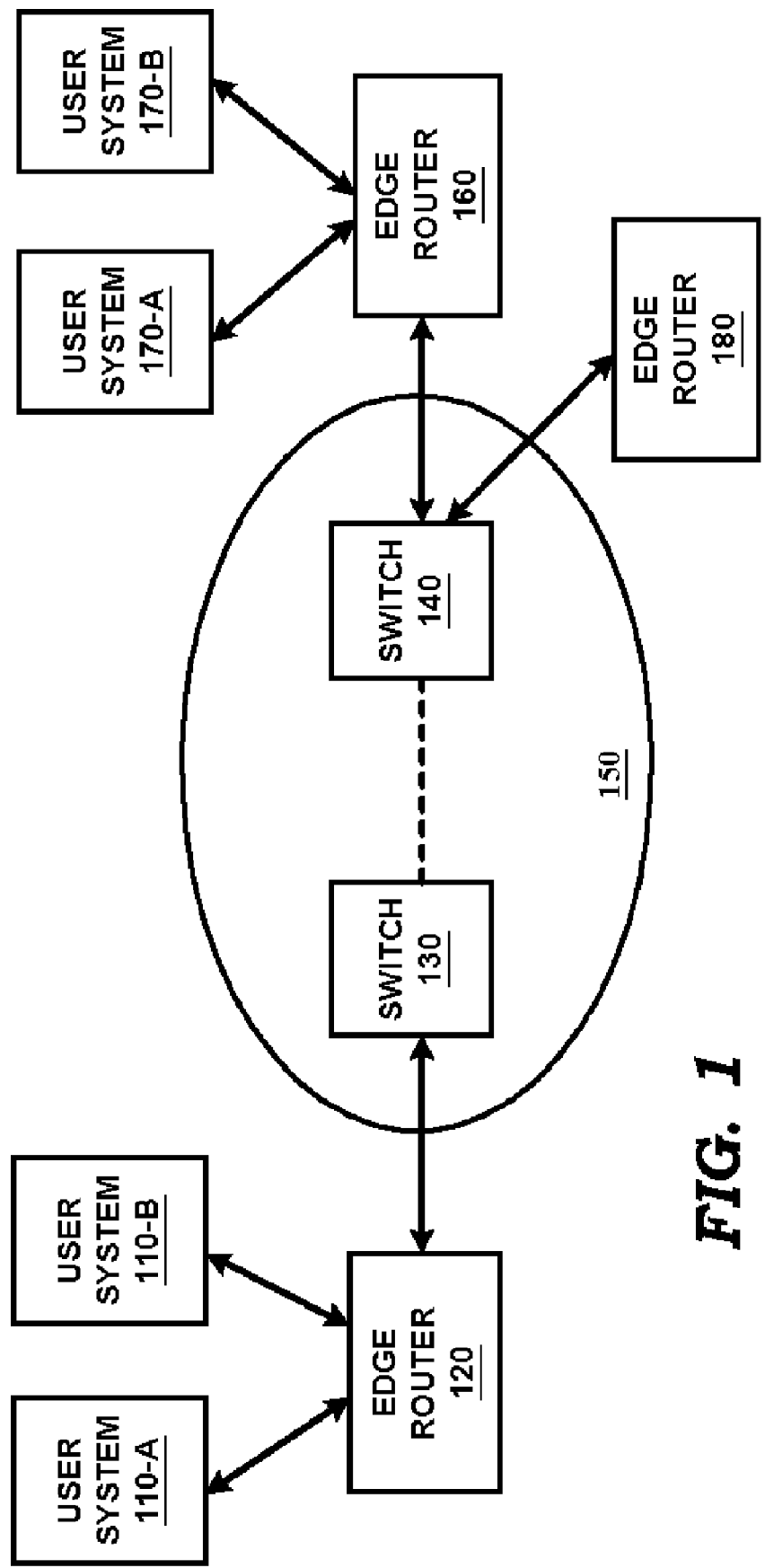
FIG. 1 is a block diagram illustrating an example environment in which the present invention can be implemented.

FIG. 1 is a block diagram illustrating an example environment in which the present invention can be implemented. The environment is shown containing user systems 110-A, 110-B, 170-A and 170-B, edge routers 120, 160 and 180, and switches 130 and 140 in ATM backbone 150. The environment is shown containing a few representative components only for illustration. In reality, each environment typically contains many more components. Each component is described below in further detail.

User systems 110-A, 110-B communicate with user systems 170-A and 170-B using ATM backbone 150. Each user system (e.g., 110-A) interfaces with the connected (e.g., user system 110-A is shown connected to edge router 120) edge router(s) using a protocol such as Internet Protocol (IP). Each user system may correspond to a computer system or workstation, and can be implemented in a known way.

ATM backbone 150 is shown containing switches 130 and 140. Switches 130 and 140 operate consistent with the ATM protocol, and may be implemented in a known way. In general, switches enable edge routers 120, 160 and 180 to communicate with each other using ATM protocol.

Edge router 120 interfaces with user systems 110-A and 110-B using IP protocol, and with switch 130 using ATM. Edge router 120 may use a PVC (bidirectional in nature) to communicate with each of the other edge routers 160 and 180. The edge routers at either end of a PVC are referred to as end systems in the present application. OAM loopback cells may be used for fault management of the PVCs. The present invention enables the OAM messages to be reduced as described below.

For illustration, it is assumed that a PVC is set up between edge routers 120 and 160. Instead of sending OAM command cells at regular intervals (e.g., every 10 seconds), edge router 120 may conclude that the PVC is operational based on the determination by edge router 160 that the PVC is operational.

Edge router 120 may determine that edge router 160 has determined that the PVC is operational by examining a frequency at which the OAM command cells are received. As is well known, edge routers are typically implemented to transmit loopback command cells at a default interval, but increase the frequency of the transmissions if the loopback acknowledgment cells are not consistently received (or there is question on operability otherwise).

Thus, if edge router 160 consistently receives loopback acknowledgment cells from edge router 120, edge router 160 may determine that the PVC is operational. Accordingly, edge router 160 sends loopback command cells at the same default rate. So long as loopback command cells are received at the same rate, edge router 120 may conclude that the PVC is operational and not send loopback command cells. Thus, the OAM cells may be reduced by up to 50% in accordance with the present invention. The description is continued with reference to a flow chart of FIG. 2.

3. Method

Figure 2:
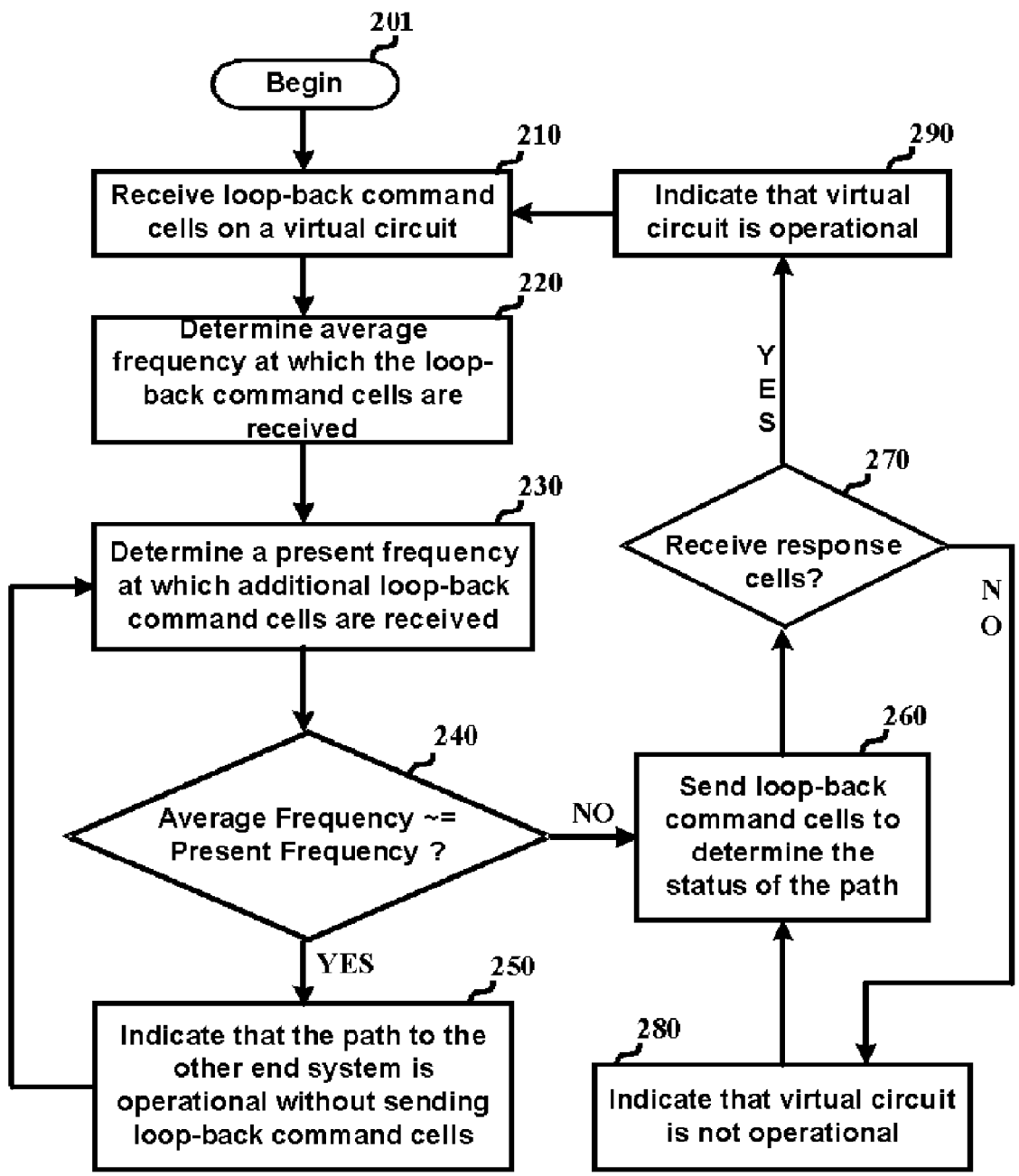
FIG. 2 is a flow chart illustrating a method in accordance with the present invention.

FIG. 2 is a flow chart depicting a method in accordance with the present invention. The method is described with reference to reduction of fault detection cells on a PVC set up between edge router 120 and edge router 160 of FIG. 1 for illustration. However, the present invention may be performed in other end systems and environments also. The method starts in step 201, in which control immediately passes to step 210.

In step 210, edge router 120 receives several loopback command cells on a PVC from, for example edge router 160. The cells may be received in a known way. In step 220, edge router 120 determines the average frequency at which the loopback command cells are received. The average may be computed based on several successive cells to account for transient situations such as traffic congestion in the path, etc.

In step 230, edge router 120 determines a present frequency at which the loopback command cells are being received. In one embodiment, a time stamp is associated with each received command cell. If a subsequent cell is not received within a time duration determined by the present frequency, then control passes to step 260 (via step 240). A timer may be used for such an implementation.

In step 240, edge router 120 determines whether the present frequency at least approximately equals (shown as symbol '~=' in FIG. 2) the average frequency determined in step 210. If such equality exists, edge router 120 may conclude that the PVC is operational and control passes to step 250; otherwise control passes to step 260. In a timer based approach noted in step 230, expiration of timer implies that the present frequency exceeds the average frequency, and thus control passes to step 260.

In step 260, edge router 120 continues to send loopback command cells to independently determine the status of the path to edge router 160. In step 270, edge router 120 determines whether the corresponding loopback response cells are received from the other end system. Control passes to step 290 if the loopback cells are received, or else control passes to step 280.

In step 280, edge router 120 indicates internally the virtual circuit is not operational. From step 280, control passes to step 260. In step 290, edge router 120 indicates that the virtual circuit is operational. Control then passes to step 210. By not sending the loopback command cells to edge router 160, a reduction of up to 50% of OAM related command cells on ATM backbone 150 may be achieved.

The details of an embodiment of edge router 120 as relevant to the present invention is described below.

4. Edge Router

Figure 3:
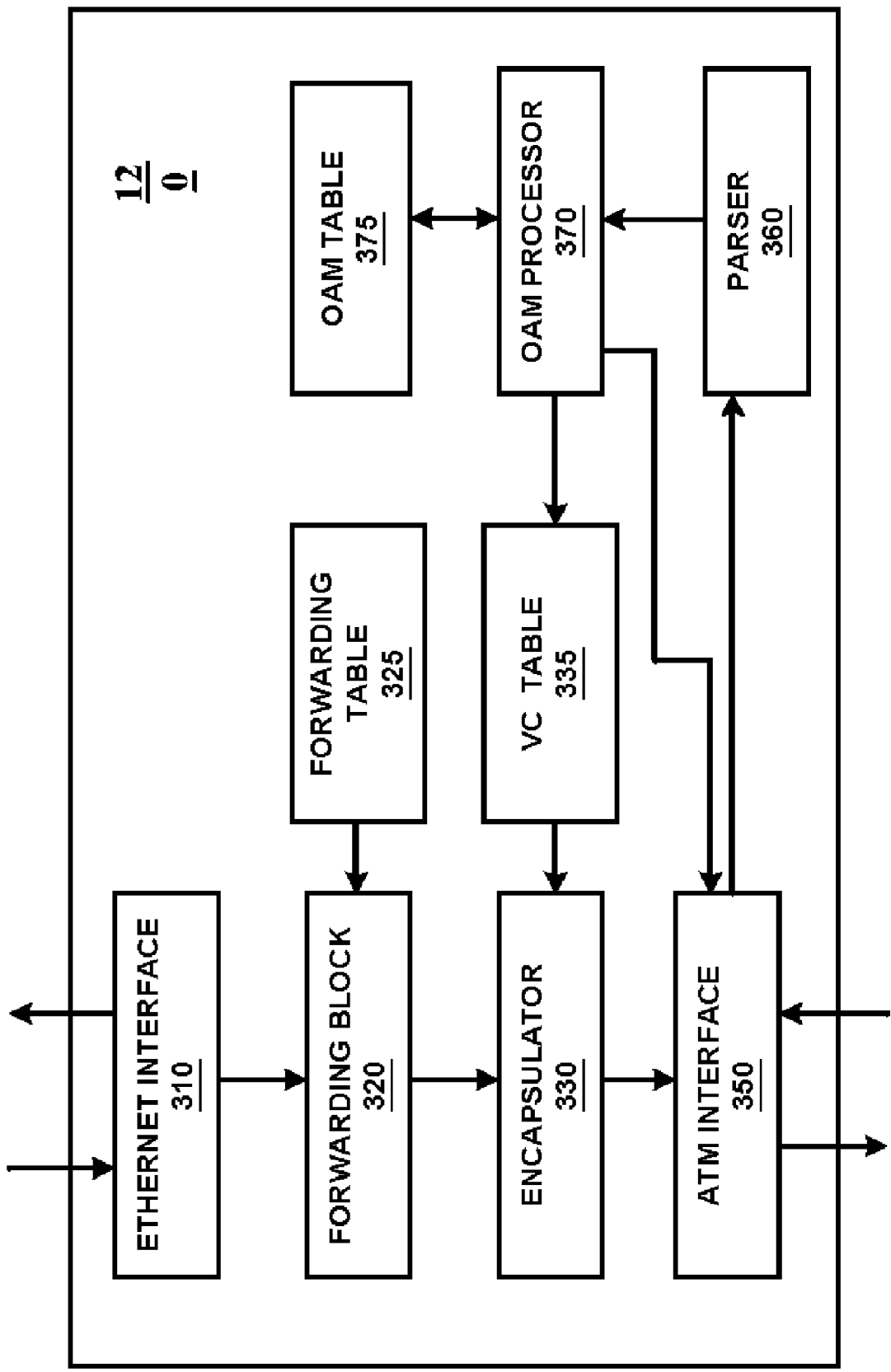
FIG. 3 is a block diagram illustrating the internals of an edge router provided in accordance with the present invention.

FIG. 3 is a block diagram illustrating the internals of an embodiment of edge router 120 as relevant to several aspects of the present invention. Edge router 120 is shown containing ethernet interface 310, forwarding block 320, encapsulator 330, ATM interface 350, parser 360 and OAM processor 370. Each block is described below in further detail.

Ethernet interface 310 provides the electrical and protocol interfaces necessary to send and receive IP packets. Ethernet interface 310 forwards each received packet to forwarding block 320. Forwarding block 320 examines the header of each packet and determines the direction in which to forward the packet based on the entries in forwarding table 325. Forwarding block 320 and ethernet interface 310 may be implemented in a known way.

Forwarding table 325 indicates the manner (outbound interface) in which each IP packet is to be forwarded, and may be populated using one of several known routing protocols (and/or manual configuration). For purpose of illustration, it will be assumed that a packet is to be forwarded on ATM backbone 150, and accordingly the packet is forwarded to encapsulator 330.

Encapsulator 330 encapsulates each IP packet in the form of potentially multiple cells. The specific VC on which to forward the packet may be determined based on the entries in VC table 335. Encapsulator 330 may also be implemented in a known way.

VC table 335 may contain data representing the various VCs (virtual circuits) terminating on edge router 120. VC table 335 may further indicate the status of each VC (e.g., PVC to edge router 160). Data cells (i.e., non-management related data) may be transmitted on a VC only if the VC is indicated to be operational. OAM processor 370 may set the status information as described below.

ATM interface 350 provides the physical, electrical and protocol interfaces necessary to send and receive ATM cells. ATM interface 350 forwards each cell to parser 360. Parser 360 examines the cell to determine the manner in which to process the cell. For illustration, it will be assumed that the cell is a OAM loopback cell used for fault management of the PVC on which the cell is received. Accordingly, the cell is forwarded to OAM processor 370. ATM interface 350 and parser 360 may be implemented in a known way.

OAM processor 370 determines whether each PVC is operational in accordance with an aspect of the present invention. The status of some of the PVCs may be determined by monitoring the frequency of the loopback command cells on the corresponding PVCs as described above. To determine the average and present frequencies, multiple time stamps (e.g., prior 5) representing the time points at which successive prior cells are received may be stored in OAM table 375. The averages may be computed based on the time stamps in a known way.

At least when the status of the PVC is not yet determined or cannot be determined based on command cells received from other end systems, OAM processor 370 sends loopback command cells to the end system ("other end system") at the other end of the PVC. The other end system sends loopback response cells which would confirm that the PVC is operational in both directions. To correlate command cells with the later received response cells, a unique tag may be generated associated with each command cell and included in the cell. The tags also may be stored in OAM table 375.

Thus, when a OAM response cell is received, the tag in the cell may be compared with the tags in OAM table 375 to ensure that all the sent cells are received. If at least a substantial number of response cells are not received, OAM processor 370 may increase the frequency at which the command cells are sent.

Once the PVC is determined to be operational, the corresponding entry in VC table 335 is updated to reflect that the PVC is operational. While some of the basic underlying principles are described above, it is generally necessary for end systems to inter-operate with other end system with same or different implementations. Operation with some of such other implementations is described below.

5. Inter-operability

In an embodiment, edge router 120 is implemented to stop sending loopback command cells only if the average interval at which edge router 120 transmits is more than the average interval at which the other end system (e.g., edge router 160) transmits the command cells. In other words, when both end systems implement the features of the present invention, the end system with the lower interval (i.e., higher transmit frequency) for transmitting command cells continues transmission.

In case an end system with a lower interval (for sending command cells) does not implement the invention, edge router 120 may be implemented to stop transmitting the command cells after waiting for a short duration. Thus, both the end systems continue transmission for a while and then the end system with the higher interval (lower frequency) stops sending the command packets.

In case both end systems have a substantially equal interval for transmitting the command cells, a random number may be used to determine which end system stops sending the loopback command cells. Thus, both end systems may generate a respective random number, and continue transmission of command cells for a duration proportionate to the corresponding generated random number. At the end of the duration, further transmission may continue only if the command cells are not received from the other end system. If both end systems stop transmission, then both may re-start transmission and use the random number until only one of the two end systems stops transmitting.

It should be understood that each feature of the present invention can be implemented in a combination of one or more of hardware, software and firmware. In general, when throughput performance is of primary consideration, the implementation is performed more in hardware (e.g., in the form of an application specific integrated circuit). When cost is of primary consideration, the implementation is performed more in software (e.g., using a processor executing instructions provided in software/firmware). Cost and performance can be balanced by implementing edge router 120 with a desired mix of hardware, software and/or firmware. An embodiment implemented substantially in software is described below.

6. Software Implementation

Figure 4:
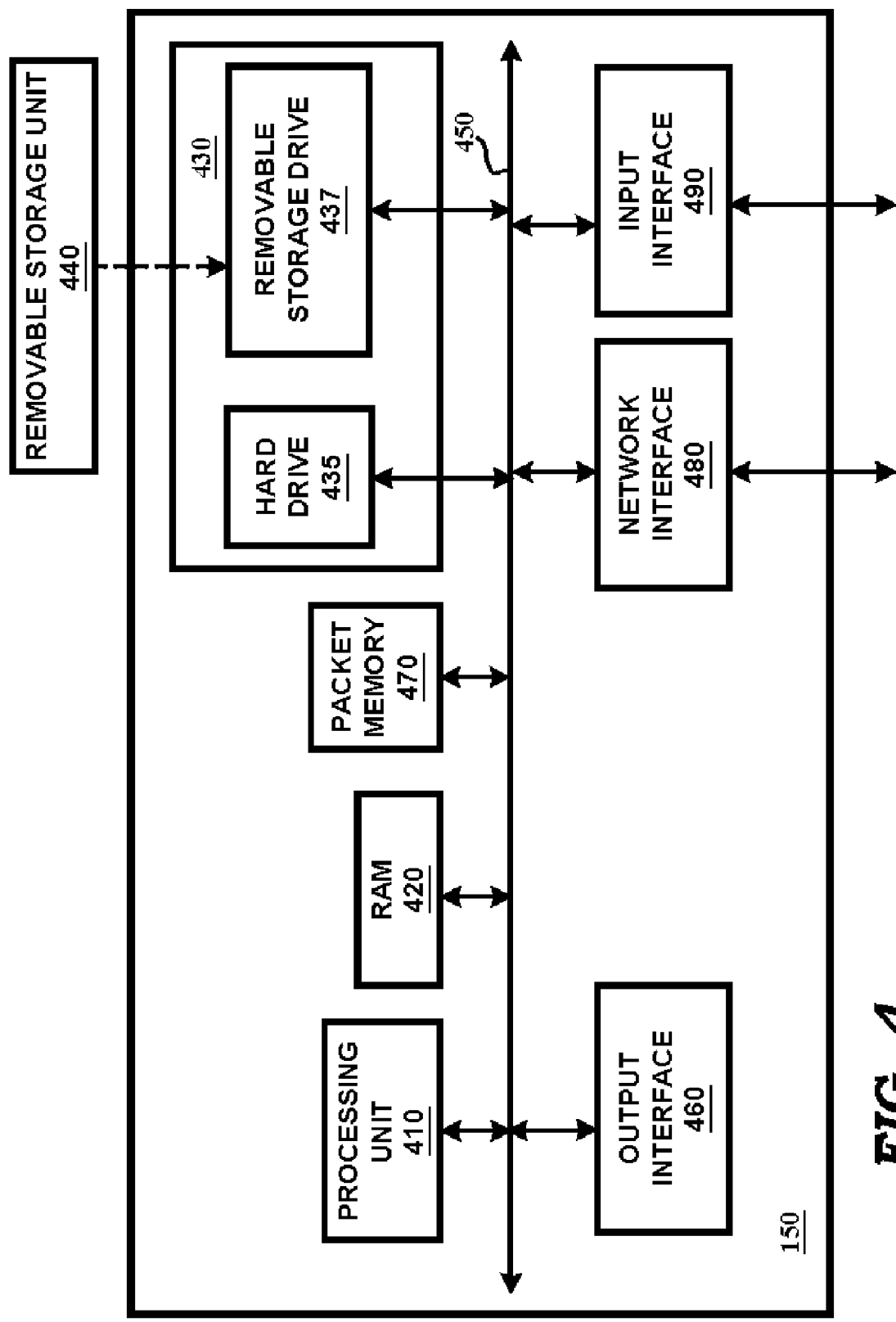
FIG. 4 is a block diagram illustrating another embodiment of the present invention implemented substantially in the form of software.

FIG. 4 is a block diagram illustrating the details of edge router 120 in one embodiment. Edge router 120 is shown containing processing unit 410, random access memory (RAM) 420, storage 430, output interface 460, packet memory 470, network interface 480 and input interface 490. Each component is described in further detail below.

Output interface 460 provides output signals (e.g., display signals to a display unit, not shown) which can form the basis for a suitable user interface for an administrator to interact with edge router 120. Input interface 490 (e.g., interface with a key-board and/or mouse, not shown) enables an administrator to provide any necessary inputs to edge router 120. Output interface 460 and input interface 490 can be used, for example, to enable a network administrator to configure various virtual circuits and specify the intervals at which the OAM command cells are to be transmitted.

Network interface 480 enables edge router 120 to send and receive data on communication networks using asynchronous transfer mode (ATM) and internet protocol (IP). Network interface 480 may correspond to ethernet interface 310 and ATM interface 390 of FIG. 3. Network interface 480, output interface 460 and input interface 490 can be implemented in a known way.

RAM 420, storage 430, and packet memory 470 may together be referred to as a memory. RAM 420 receives instructions and data on path 450 from storage 430, and provides the instructions to processing unit 410 for execution.

In addition, RAM 420 may be used to implement one or more of forwarding table 325, VC table 335, and OAM table 375. Packet memory 470 stores (queues) cells/packets waiting to be forwarded (or otherwise processed) on different ports.

Secondary memory 430 may contain units such as hard drive 435 and removable storage drive 437. Secondary storage 430 may store the software instructions and data, which enable edge router 120 to provide several features in accordance with the present invention.

Some or all of the data and instructions may be provided on removable storage unit 440, and the data and instructions may be read and provided by removable storage drive 437 to processing unit 410. Floppy drive, magnetic tape drive, CD_ROM drive, DVD Drive, Flash memory, removable memory chip (PCMCIA Card, EPROM) are examples of such removable storage drive 437.

Processing unit 410 may contain one or more processors. Some of the processors can be general purpose processors which execute instructions provided from RAM 420. Some can be special purpose processors adapted for specific tasks (e.g., for memory/queue management). The special purpose processors may also be provided instructions from RAM 420. In general processing unit 410 reads sequences of instructions from various types of memory medium (including RAM 420, storage 430 and removable storage unit 440), and executes the instructions to provide various features of the present invention.

Embodiments according to FIG. 4 can be used to reduce the loopback cells used for fault detection in virtual circuits as described above. While the embodiments above have been described with reference to ATM substantially, it should be understood that various aspects of the present invention can be implemented in other environments (e.g., frame relay). Implementations in such other environments are also contemplated to be within the scope and spirit of several aspects of the present invention.

7. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method of determining the status of a bi-directional virtual circuit in a first end system, wherein said bi-directional virtual circuit is provisioned between said first end system and another end system, said method comprising:

receiving in said first end system a first plurality of loopback command packets from said another end system on said bi-directional virtual circuit;

examining a receive frequency at which said plurality of loopback command packets are received; and determining not to send loopback command packets to said another end system if said receive frequency does not vary from a predetermined frequency by more than a predetermined threshold;

sending another plurality of loopback command packets at a sending frequency; and comparing said sending frequency with said receive frequency, wherein said first end system determines not to send new loopback command packets based on said comparing.

2. The method of claim 1, further comprising sending a second plurality of loop back command packets to said another end system if said receive frequency varies from said predetermined frequency by more than a predetermined threshold.

3. The method of claim 2, further comprising determining that said bi-directional virtual circuit is not operational if no response packets are received in response to said second plurality of loop back command packets sent to said another end system.

4. The method of claim 3, wherein said bi-directional virtual circuit comprises a permanent bi-directional virtual circuit provisioned on an asynchronous transfer mode (ATM) backbone, and each of said first plurality of loopback command packets, said second plurality of loopback command packets and said response packets comprises a cell.

5. The method of claim 4, wherein said cell is generated consistent with ITU_T Recommendation I.610.

6. The method of claim 1, wherein said first end system determines not to send new loopback command packets if said sending frequency is less than said receiving frequency.

7. The method of claim 1, wherein said first end system waits a random amount of time before stopping sending new loopback command packet if said sending frequency is at least approximately equal to said receive frequency.

8. The method of claim 1, wherein each of said first end system and said another end system comprises an edge router.

9. A first end system determining the status of a bi-directional virtual circuit, wherein said bi-directional virtual circuit is provisioned between said first end system and another end system on a network backbone, said first end system comprising:

an interface coupled to said network backbone, said interface receiving a first plurality of loopback command packets from said another end system on said bi-directional virtual circuit; and a processor examining a receive frequency at which said plurality of loopback command packets are received, and determining not to send loopback command packets to said another end system if said receive frequency does not vary from a predetermined frequency by more than a predetermined threshold, wherein said processor sends another plurality of loopback command packets at a sending frequency, compares said sending frequency with said receive frequency, and determines not to send new loopback command packets based on said comparing.

10. The first end system of claim 9, wherein said processor sends a second plurality of loopback command packets to said another end system if said receive frequency varies from said predetermined frequency by more than a predetermined threshold.

11. The first end system of claim 10, wherein said processor determines that said bi-directional virtual circuit is not operational if no response packets are received in response to said second plurality of loopback command packets sent to said another end system.

12. The first end system of claim 9, wherein said processor determines not to send new loopback command packets if said sending frequency is less than said receiving frequency.

13. A first end system determining the status of a bi-directional virtual circuit, wherein said bi-directional virtual circuit is provisioned between said first end system and another end system on a network backbone, said first end system comprising:

means for receiving in said first end system a first plurality of loopback command packets from said another end system on said bi-directional virtual circuit;

means for examining a receive frequency at which said plurality of loopback command packets are received;

means for determining not to send loopback command packets to said another end system if said receive frequency does not vary from a predetermined frequency by more than a predetermined threshold; and means for sending another plurality of loopback command packets at a sending frequency; and comparing said sending frequency with said receive frequency, wherein said first end system determines not to send new loopback command packets based on said comparing.

14. The first end system of claim 13, further comprising means for sending a second plurality of loopback command packets to said another end system if said receive frequency varies from said predetermined frequency by more than a predetermined threshold.

15. A computer readable medium carrying one or more sequences of instructions for causing a first end system to determine the status of a bi-directional virtual circuit, wherein said bi-directional virtual circuit is provisioned between said first end system and another end system, wherein execution of said one or more sequences of instructions by one or more processors contained in said first end system causes said one or more processors to perform the actions of:

receiving in said first end system a first plurality of loopback command packets from said another end system on said bi-directional virtual circuit;

examining a receive frequency at which said plurality of loopback command packets are received; and determining not to send loop back command packets to said another end system if said receive frequency does not vary from a predetermined frequency by more than a predetermined threshold;

sending another plurality of loopback command packets at a sending frequency; and comparing said sending frequency with said receive frequency, wherein said first end system determines not to send new loopback command packets based on said comparing.

16. The computer readable medium of claim 15, further comprising sending a second plurality of loopback command packets to said another end system if said receive frequency varies from said predetermined frequency by more than a predetermined threshold.

17. The computer readable medium of claim 16, further comprising determining that said bi-directional virtual circuit is not operational if no response packets are received in response to said second plurality of loopback command packets sent to said another end system.

* * * * *